April 13, 1926.
J. M. HOWE
1,580,732
MINIATURE AUTOMOBILE
Filed May 15, 1924
6 Sheets-Sheet 5
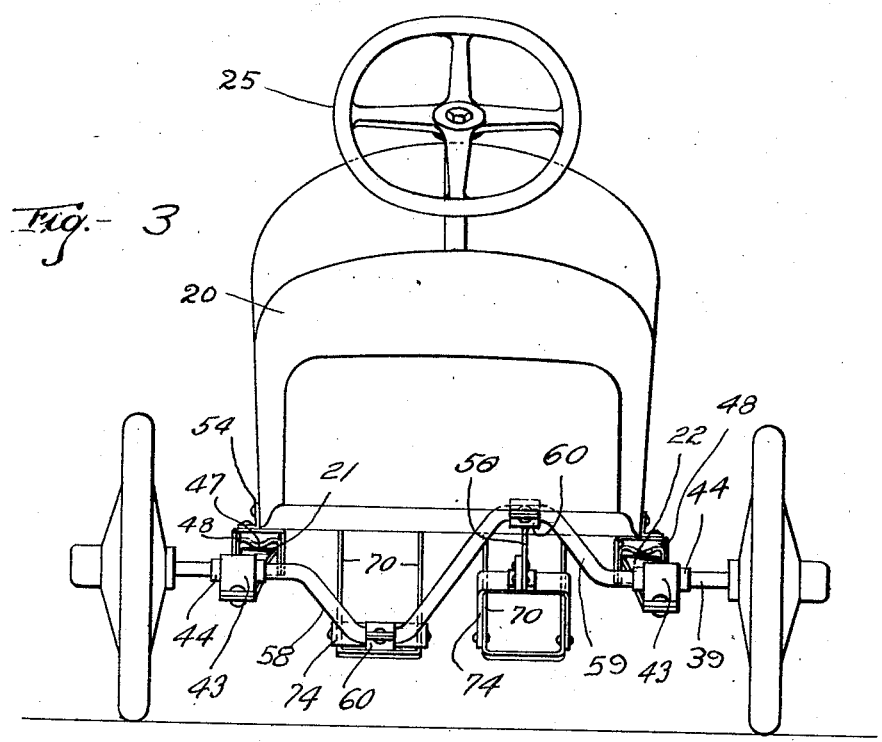
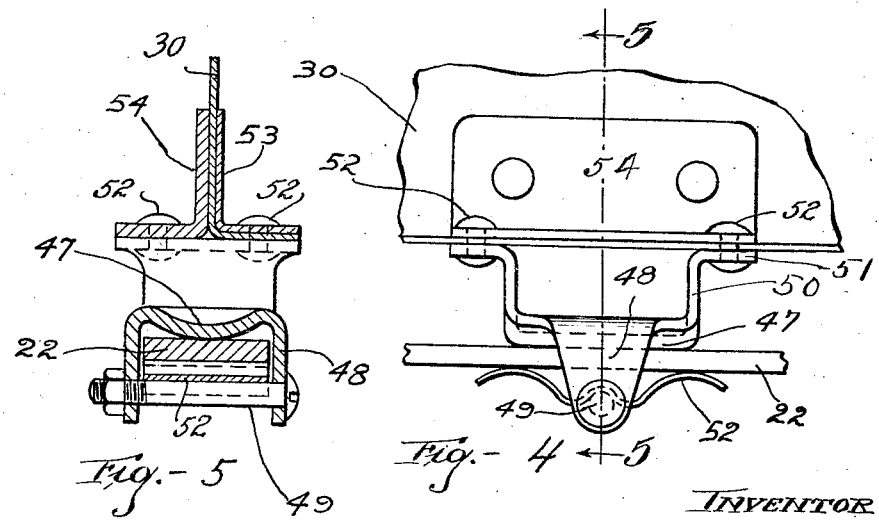
INVENTOR
James M. Howe
By Bates, Macklin, Goldrick & Teare
ATTYS.

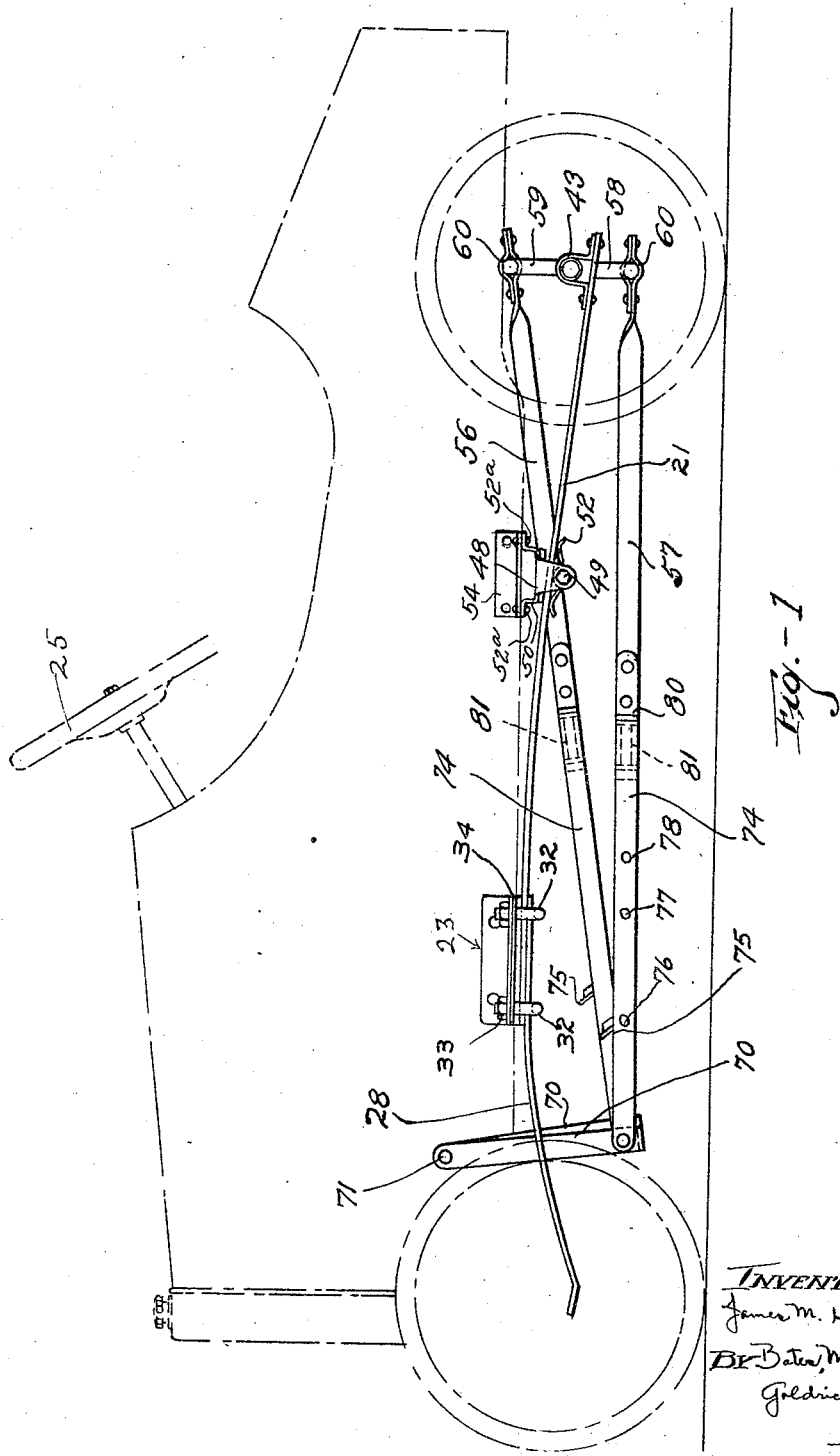

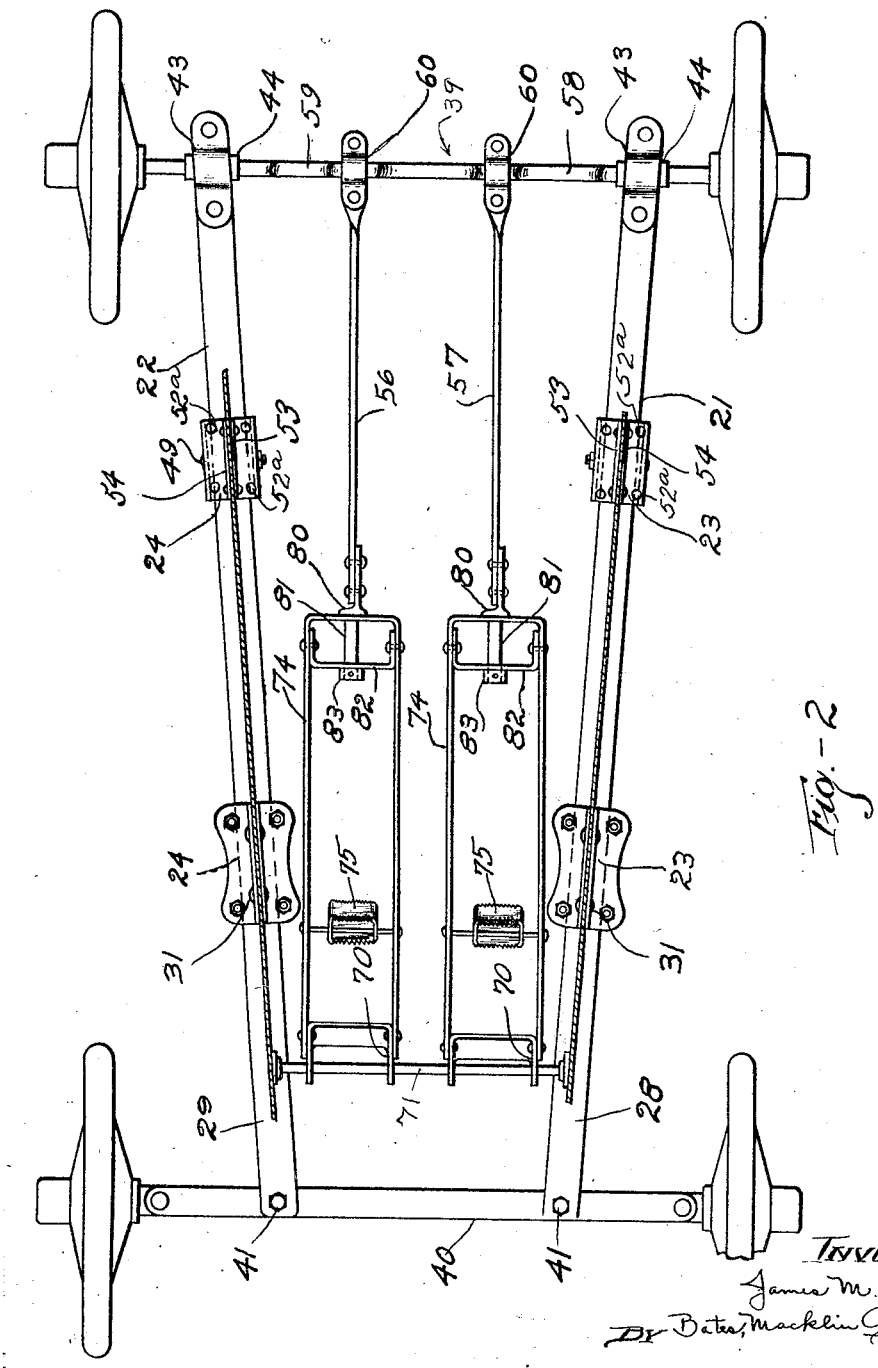

April 13, 1926.　　　　　　　J. M. HOWE　　　　　　1,580,732
MINIATURE AUTOMOBILE
Filed May 15, 1924　　　　6 Sheets-Sheet 4

April 13, 1926.  J. M. HOWE  1,580,732
MINIATURE AUTOMOBILE
Filed May 15, 1924   6 Sheets-Sheet 5

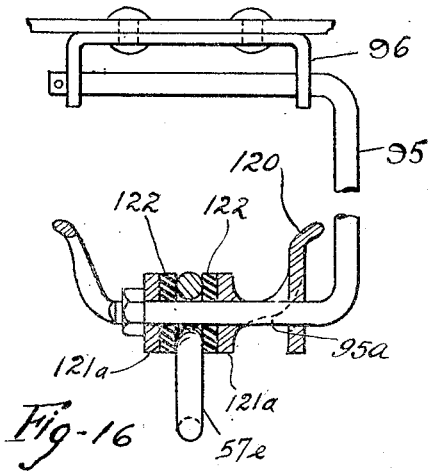
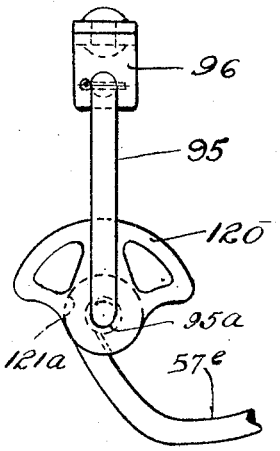
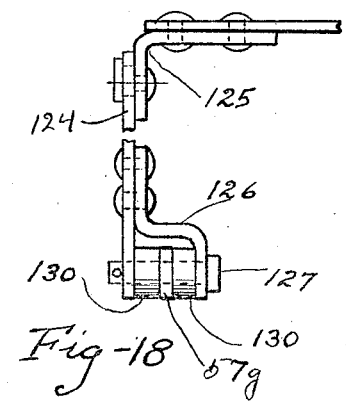
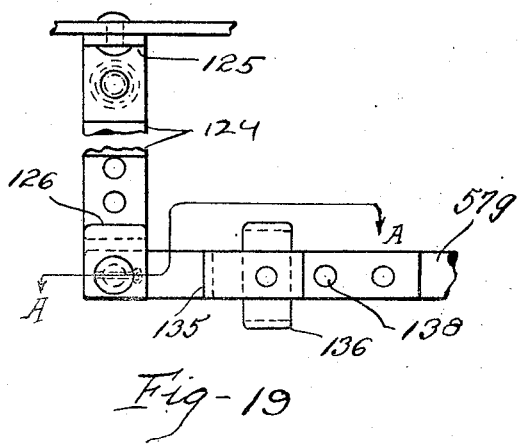
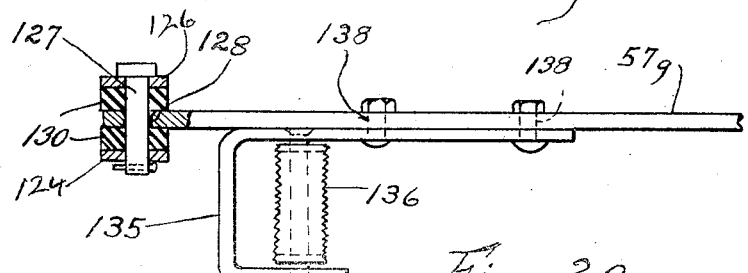

Patented Apr. 13, 1926.

1,580,732

UNITED STATES PATENT OFFICE.

JAMES M. HOWE, OF CLEVELAND HEIGHTS, OHIO, ASSIGNOR TO THE MURRAY PRODUCTS COMPANY, OF CLEVELAND, OHIO, A CORPORATION OF MICHIGAN.

MINIATURE AUTOMOBILE.

Application filed May 15, 1924. Serial No. 713,451.

*To all whom it may concern:*

Be it known that I, JAMES M. HOWE, a citizen of the United States, residing at Cleveland Heights, in the county of Cuyahoga and State of Ohio, have invented a certain new and useful Improvement in a Miniature Automobile, of which the following is a full, clear, and exact description, reference being had to the accompanying drawings.

This invention is concerned with toy vehicles of the foot propelled type and has for its general object the provision of a novel body spring construction and axle drive which may be so connected to the vehicle body that a full reflecting movement of the driving axle at either one or both ends thereof relative to the body may be obtained.

A more specific object of my invention is the provision of a vehicle drive, particularly adaptable for use on a toy vehicle provided with a body spring suspension, the novel arrangement of the parts comprising the driving mechanism being such that a full deflecting movement of the rear axle of the vehicle relative to the body thereof may be obtained without any resulting disorganization or undue depreciation of the parts comprising the driving mechanism.

Other objects of my invention will hereinafter be set forth in the following description which refers to the accompanying drawings illustrating several embodiments thereof. The essential characteristics are summarized in the claims.

Figure 10:
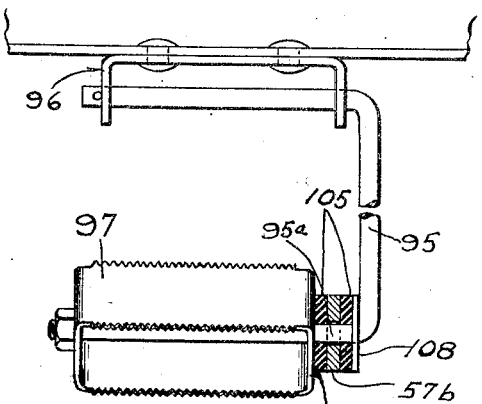
Figure 11:
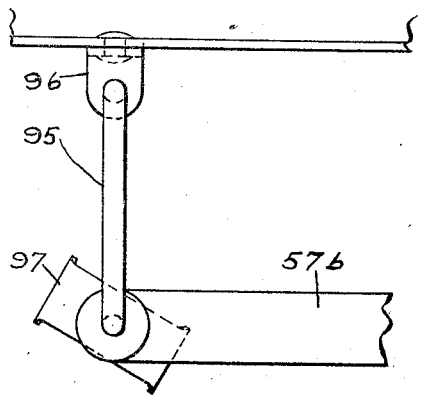
Figure 8:
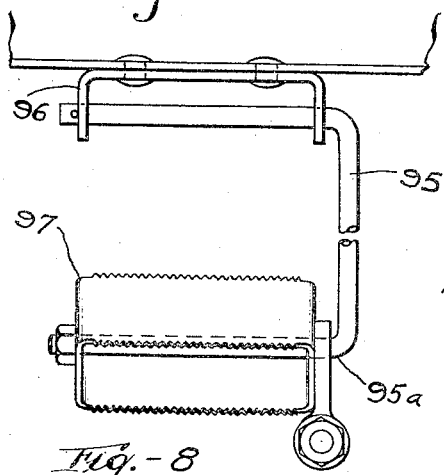
Figure 9:
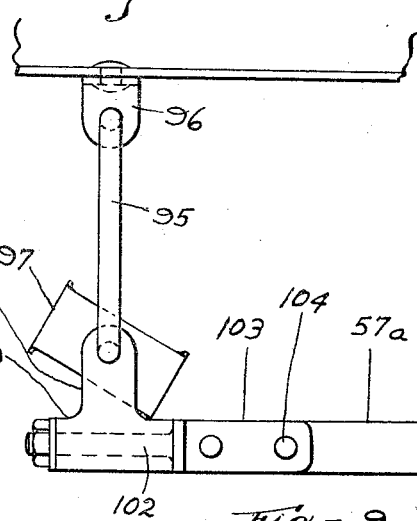
Figure 6:
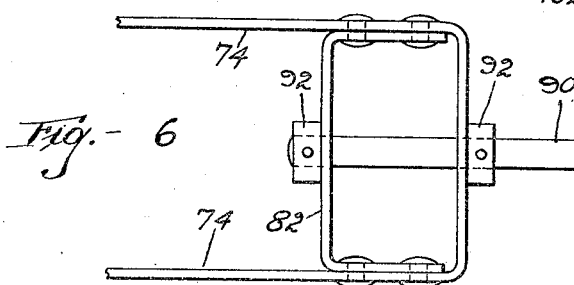
Figure 7:
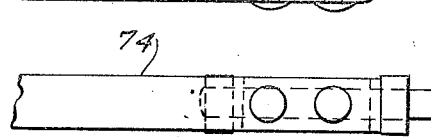
Figure 14:
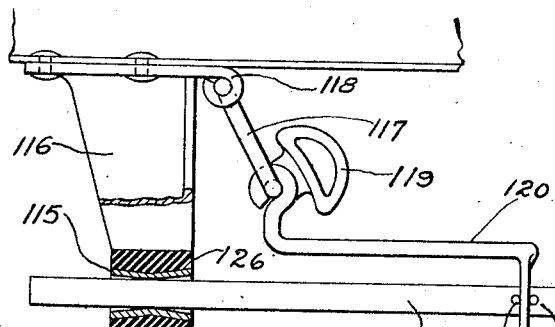
Figure 15:
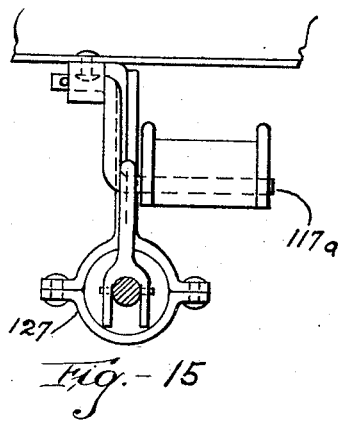
Figure 12:
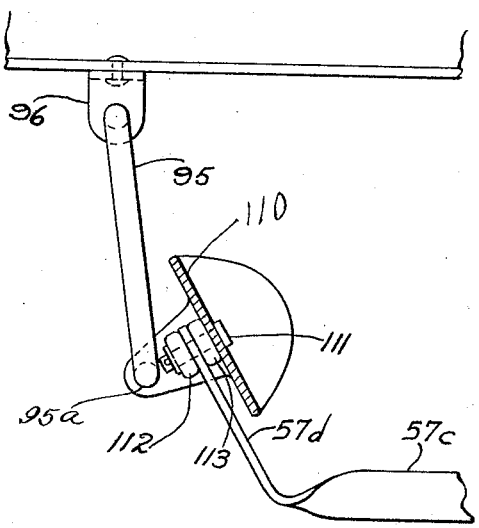
Figure 13:
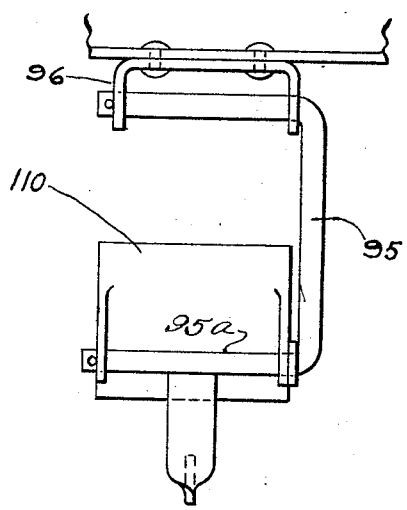

Fig. 1 is a side elevation of a toy vehicle of a construction embodying one form of my invention; Fig. 2 is a plan view showing the relationship of a vehicle drive, the front and rear axles and spring suspension for the body; Fig. 3 is a rear elevation of the vehicle; Fig. 4 is a novel attaching or spring shackle means for resiliently securing longitudinal springs to the vehicle body; Fig. 5 is a cross-sectional view taken substantially along the line 5—5 of Fig. 4; Fig. 6 is an enlarged fragmentary plan view of a portion of the driving mechanism which is arranged to permit a turning movement of propeller members of the driving mechanism relative to the pedal operated means; Fig. 7 is a side elevation of the mechanism illustrated in Fig. 6; Figs. 8 and 9 illustrate a modified form of the device shown in Figs. 6 and 7; Figs. 10 and 11 illustrate another modification of a connecting means extending between the pedal operated means and the propelling members; Figs. 12 and 13 illustrate a modification of the device shown in Figs. 10 and 11; Figs. 14 and 15 illustrate still another form of connecting means extending between the pedal operated means and propeller members; Figs. 16 to 20 show alternate forms of pedal mechanisms associated with my novel propeller connecting means.

A variety of foot propelled toy vehicles have heretofore been manufactured and placed upon the market which were provided either with a crank and gear motion for driving the rear axle or straight crank motion with the rear axle comprising the crank, but such vehicles have always been rigidly supported by the front and rear axles thereof.

This practice has prevailed due to the dictates of economy and to the fact that no simple device has been presented to the manufacturer for driving such a vehicle when provided with a spring suspension.

My invention accordingly contemplates the provision of a very simple means for attaching the propelling members of the driving mechanism of a toy vehicle to pedal levers or brackets suspended from the body of the vehicle whereby the propelling members may have a free turning or twisting movement to follow the floating movements of the rear axle without causing undue binding, frictional wear or other depreciation of the driving mechanism. I may thus provide the toy vehicle with a very desirable feature namely a full spring suspension of the body in a very satisfactory and economical manner.

In Figs. 1 to 3 I show a toy vehicle constructed in accordance with the objects of my invention and which may comprise a body 20 flanged around the bottom (see Fig. 4) to be of sufficient strength whereby the body may serve as a chassis and to which I may directly attach longitudinal spring members 21 and 22 by brackets 23 and 24. These spring members may, if desired, extend the entire length of the vehicle and be attached to the front and rear axles thereof in the manner shown in my prior application, Serial No. 641,616 filed May 26, 1923. In the present instance, however, I prefer to have the spring members 21 and 22 terminate intermediate the steering wheel 25 and the front of the vehicle and I provide separate spring members 28 and 29 for the front axle which may overlap the ends of the springs 21 and 22 and which may also be secured to the body of the vehicle by the brackets 23 and 24.

The brackets 23 and 24 may comprise pairs of angle members, one of each pair being disposed on the inside and the other on the outside of the side walls 30 of the vehicle body. The bracket members may be secured to the body by any suitable means such as rivet members 31. Liner or clamping plates 34 may be disposed between the brackets and the spring members whereby U-bolts 32 may engage the ends of the spring members and rigidly secure the brackets, the spring members and the liner plates when clamping nuts 33 engaging the legs thereof are tightened. The length of cantilever spring thus afforded by the foregoing arrangement assures an easy floating action of the rear axle. The forward spring members 28 and 29 are rigidly attached to the forward axle 40 in a rigid manner by any suitable means such as the bolt members 41 and the rear spring members 21 and 22 may be attached to the rear axle 39 by bearing supporting members 43 which rigidly support bearing cylinders 44.

Intermediate the spring brackets 23 and 24 and the rear ends of the springs 21 and 22 or the point where they are attached to the rear axle, I provide spring stabilizing means or shackles which may be secured to the sides of the vehicle body and may comprise bracket members such as are illustrated in Figs. 4 and 5. The construction of these bracket members is such that the rear spring members may have a vertical movement relative to the body of the vehicle and the shackles. The brackets, as shown, may comprise stampings, arcuately shaped as shown at 47, where contact is made with the spring. Downwardly extending side lugs 48 are provided in the shackles which may comprise a bearing for retaining bolts 49. The shackle brackets are provided with upwardly extending lugs 50 having flanges 51 affording engagement for rivet members 52ª which secure the shackles to L-shaped members 53 and 54 secured on the inner and outer sides of the vehicle body adjacent the bottom flanged edge 55 thereof. To prevent a vibratory action of the rear spring members, I provide a resilient means supported by each bracket which may comprise follow spring 52 having a wing shape whereby it may be supported and retained by the bolt member 49.

The foregoing described spring suspension as will be readily understood may be embodied in a toy vehicle at a very small cost and will permit a full deflecting movement of either end of the rear axle, when the corresponding wheel mounted thereon passes over an obstruction.

It is important, however, that this deflecting movement of this rear axle does not react on the driving mechanism, of whatever character, in such a manner as to cause an increase in its operative friction or to cause a binding or wearing of the parts. The driving mechanism embodied in my vehicle as stated, is preferably of the class including a rear crank axle, oscillating pedals suspended from the body and propeller means connecting the pedals with the crank portions of the rear axle. It is important therefore that a mechanism of this class be devised in such a manner that the propelling members connected to the crank portions of the rear axle shall be free to swing, not only in vertical planes, but in any plane tilted slightly relative to the vertical plane of operation.

This result may be obtained by incorporating in the drive mechanism a connecting mechanism between the propeller members and the pedal mechanism to permit a tilting movement of the propelling members relative to the pedal mechanism. As shown in Fig. 2 the drive mechanism may comprise the usual connecting rods or propelling members 56 and 57 which may be attached to the crank portions 58 and 59 respectively of the rear axle by tubular bearing members 60.

The pedal mechanism may comprise U-shaped oscillating levers 70 pivotally supported by a shaft 71 suitably secured to the side walls of the vehicle body adjacent the forward end thereof. Pivotally attached to these levers 70, and extending rearwardly a substantial distance, may be flat pedal supporting bars 74 preferably of a U-shape and between the legs of which, may be adjustably mounted the pedal members 75. The pedal members may be pivotally attached thereto by any convenient means, such as a removable bolt member 76 which may be inserted in various holes 77, 78, etc., formed in the members 74, to adapt the drive mechanism to the leg length of the operator.

The connecting means between the pedal mechanism and the propeller members 56 and 57, in this form of my invention may comprise connecting pivot members 80 bolted or riveted to the propelling members 56 and 57. The members 80 are provided with cylindrical portions 81 which extend through suitable openings formed in the ends of the members 74 and extend therethrough a substantial distance to pass through openings formed in spacing members 82 extending between the legs of the members 74 and preferably comprising flat iron straps of a U-shape. Retaining collar members 83 may be mounted upon the inner ends of the members 80 to maintain the propeller members 56 and 57 in pivotal engagement with the pedal supporting members 74. It will thus be seen that when either rear spring is deflected upwardly the driving relation of the pedal supporting members 74 and the propeller members 56 and 57 is not interfered with, for the propeller members may readily adjust themselves to any deflecting movement of the rear axle.

In Figs. 6 and 7, I show a slight modification in the construction of the propelling members where they are connected to the pedal supporting members 74. In this form of my invention the propeller members may comprise round rods 90 secured to the crank portions of the rear axle in any convenient manner and at the forward ends thereof to the pedal supporting members 74, in the manner described. In this form, however, there is no need of an intermediate pivotal connecting member 80, the ends of the rods 90 extending through the members 74 and 82 and collar members 92 serving to maintain the ends of the rods in proper driving engagement with the pedal supporting members 74.

In Figs. 8 and 9, I show an alternate form of pedal mechanism consisting of a U-shaped pedal lever 95 pivotally mounted on a bracket 96 secured to the vehicle body. The pedal 97 is mounted on the bottom leg 95$^a$ of the lever 95. In this form the pivotal connecting means may comprise a tubular connecting member 100 having a suitable extension or lug 101 properly apertured to engage the lower leg 95$^a$ of the U-shaped pedal lever 95. The member 100 is bored to receive a pivoting portion 102 of an end member 103 secured to the propelling member 57$^a$, in any suitable manner, such as the use of rivet members 104.

In Figs. 10 and 11, I show a modification of the form illustrated in Figs. 8 and 9 and wherein the propelling rod 57$^b$ is directly connected to pedal lever 95. The aperture in the end of the connecting or propelling rod 57$^b$ however, is substantially greater in diameter than the diameter of the pedal supporting portion 95$^a$ of the pedal lever 95 to permit a relative twisting movement of the propelling member and I provide a resilient means for maintaining the propelling member 57$^b$ in a normally aligned position. This means may comprise rubber disks 105 mounted upon the pedal lever 95 and disposed between an end 97$^a$ of the pedal and the propelling member and between the propelling member and a metallic disk member 108 rigidly positioned upon the pedal lever.

In Figs. 12 and 13, I show still another manner of directly attaching the propelling members to the pedal mechanism. In this form, the U-shaped pedal lever is retained, but the pedal 110 is of a flat construction whereby the propelling member 57$^c$ may be attached to the underside thereof. As shown in Fig. 12, the end of the propelling member 57$^c$ is formed of a flat bar twisted and bent upwardly to be attached to the underface of the pedal member 110, by a pin member 111. In this form I provide rubber spacing members 112 and 113 which cushion the end of the propelling member where it is attached to the pedal. A relative twisting movement between the pedal and the propelling member is thereby permitted when the rear axle is deflected in the manner described. It will be understood of course that the nature of the connection beneath the pedal may be modified in various ways.

In Figures 14 and 15, I illustrate still another modification of a propeller mechanism and particularly the pedal mechanism whereby I may obtain the desired result, hereinbefore set forth. In this form, the propelling members may comprise, rods or bars provided at their forward ends, with cylindrical portions 57$^d$ which are slidably mounted in a sleeve member 115 in the nature of a bearing supported by a rigid bracket 116 depending from the body of the vehicle. The bearing sleeve 115 may, as shown, be of an inverted coniform with each end thereof of a greater diameter than the middle of the sleeve. The pedal 119 is attached to a pedal supporting portion 117$^A$ of the lever 117 and an intermediate connecting member 120 is also pivotally connected to this portion of the pedal lever. The other end of the member 120 may extend downwardly and may be suitably apertured or fork-shaped as shown in Fig. 115 to engage the rod 57$^d$ between pins 125. If desired, the bearing sleeve 115 may be mounted in a resilient cylinder 126 formed of rubber which may be secured to the bracket 116 by a cap member 127. This construction permits a full floating movement of the propelling rod 57$^d$ when the latter is shifted out of its normal operating plane by a deflecting action of the rear axle as will be readily understood.

A modification of the construction disclosed in Figs. 12 and 13 is illustrated in Figs. 16 and 17. The propelling members in this construction may comprise round rods 57$^e$, having an eyelet formed at one end to engage with the pedal supporting legs 95$^a$ of the U-shaped pedal levers 95, the pedals 120 of this construction may comprise a stamped member having upset perforated flange portions 121$^a$, which pivotally engage the pedal lever. Between the eyelet portions of the propeller members 57$^e$ and the portions 121$^a$ of the pedal members, I insert resilient spacing members 122, preferably formed of rubber whereby the propeller members may have a floating movement relative to the pedal levers.

In Figs. 18, 19 and 20 I show a modification of the pedal suspending mechanism illustrated in Figs. 10 and 11. In this form the propeller members comprise flat rods 57s, apertured at the ends to be connected to depending links 124 which are suspended from brackets 125, secured to the body of the vehicle. The lower ends of the links 124 are provided with off set Z shaped members 126 to afford a bifurcated construction for the supporting of connecting pin members 127 which pivotally connect the link members 124 to the propelling rods 57s.. The propelling members 57s are provided with apertures 128 which are of a sufficiently larger diameter than the diameter of the pins 127 to permit the displacing of the propeller members 57s out of the plane normal to the axis of the pins 127. To maintain a normal alignment of the propeller members 57s I provide resilient disk members 130 upon the pins 127 which are disposed between the ends of the link members 124 and the Z shaped members 126 attached thereto. The pedal members in this form may be mounted directly upon the propelling members 57s and I accordingly provide pedal brackets 135 formed of flat bars U-shaped at one end for the pivotal suspension of the pedals 136. The members 135 if desired may be adjustably mounted on the propelling members 57s by the use of clamping bolts 138 extending through suitable apertures formed in the bracket members 135 and the propeller members 57s.

In the foregoing description of my invention, it will be obvious that it affords a toy vehicle construction having the desirable characteristic of a full deflecting movement of the vehicle body relative to the rear axle by reason of the spring construction which connects the axle of the vehicle to the body thereof.

By reason of the novel connection between the propelling members driving the crank portions of the rear axle and the pedal operated mechanism, the ease of propulsion of the vehicle by the operator is not interfered with in any manner when this deflection takes place. The arrangement of the propelling and pedal operating mechanisms may be such that no unusual wear or depreciation will take place on account of such deflection.

I claim:

1. In a toy vehicle of the character described the combination of a body, a pair of spring members connected to the rear axle of the vehicle and to the body, said axle having crank portions, propeller members extending longitudinally of the body, pedal levers depending from the body and connected to the propeller members and means interposed therebetween for connecting the pedal levers to the propeller members while permitting a turning movement of the propelling members relative to the pedal levers when either of said members is shifted out of their normal plane of movement.

2. In combination, in a toy vehicle, a vehicle body, a rear crank axle, spring members connecting the body to the axle, propelling members extending beneath the body and connected at one end to the crank portions of the axle, pedal operated means depending from the body adjacent the forward end thereof for supporting said propelling members and means interposed between the propelling members and said pedal operated means for permitting a twisting movement of the propelling members relative to the supporting means when either spring is deflected by the raising of one end of the rear axle.

3. In a toy vehicle of the character described, the combination of a vehicle body, a propelling means therefor comprising a rear crank axle, propelling members connected to the crank portions of the axle and extending longitudinally of the body of the vehicle and means supporting the forward end of the propelling members comprising oscillating pedal supporting members pivotally connected to the underside of the body and means connecting said last named means to the propelling member and adapted to permit a twisting movement of the propelling members relative to said forward supporting means whereby, when the rear axle is deflected at either end thereof, the coacting relationship of the propeller members and the supporting means therefore is maintained.

4. In a toy vehicle of the character described, the combination of a vehicle body, longitudinally extending springs attached to the body, a rear crank axle bearing, means connecting the rear ends of the spring members to the axle, propelling means pivotally connected to the crank portions of the rear axle and extending beneath the body of the vehicle, oscillating means depending from the body and supporting the forward ends of said propelling members and means pivotally connecting said propelling members to said supporting means whereby the propelling members may have a free propelling movement when the rear axle is displaced or deflected relative to the body of the vehicle.

5. In a toy vehicle the combination of a body, a rear axle, spring members connecting the body to the rear axle, propeller members for driving the rear axle, a pedal operated mechanism and means connecting the pedal operated mechanism and the propeller members in driving relation, said means being of a pivotal construction to permit the propelling members to follow a full floating movement of the axle while remaining in operative relation with the pedal operated mechanism.

6. In a toy vehicle of the character described, a body, a rear crank axle, propelling members in the nature of connecting rods connected to the crank portions of the rear axle, depending lever members pivotally connected to the body and comprising a pedal supporting means, pedals mounted thereon and connecting means between the pedal levers and the propelling members comprising members pivotally attached to the pedal levers and to the propelling members at separate points.

7. In a toy vehicle of the character described, the combination of a body, a rear crank axle, spring members connecting the body to the axle whereby the axle may have a full floating movement relative to the body, longitudinally extending propelling members connected to the crank portions of the rear axle, a pair of oscillating links depending from the body adjacent the forward end thereof, longitudinally movable members attached to said link members, pedal members adjustably supported on the last named members and pivotal means connecting the propelling members with the pedal supporting members.

8. In a toy vehicle of the character described, the combination with a body, a rear axle, longitudinal spring members secured at one end to the rear axle and at the other end to the body intermediate the front and the steering wheel thereof, spring stabilizing means secured to the body intermediate the steering wheel and the rear axle thereof, a propelling mechanism connected to the rear axle, pedal operated means for actuating said propelling mechanism and means for pivotally connecting the pedal operated means and the propelling mechanism, said means including pivotal connections for the pedal operated means and propelling mechanism having different axes.

9. In a toy vehicle the combination of a body, a rear axle, spring members connecting the body to the rear axle, bearing members connecting the springs to the axle, propeller members for driving the rear axle, a pedal operated mechanism and means connecting the pedal operated mechanism and the propeller members in driving relation, said means being of a pivotal construction to permit the propelling members to follow a full floating movement of the axle while remaining in operative relation to the pedal operated mechanism.

10. In a toy vehicle of the character described, a body, a rear crank axle, propelling members in the form of connecting rods connected to the crank portions of the rear axle, bearing members mounted on the propelling members, depending lever members pivotally connected to the body and comprising a pedal supporting means, pedals mounted thereon and connecting members, between the pedal levers and the propelling members comprising members having separate pivotal attachment to the pedal levers and to the propelling members.

11. In a toy vehicle of the character described, the combination of a body, a rear crank axle, spring members connecting the body to the axle whereby the axle may have a full floating movement relative to the body, said spring members being of the cantilever type and rigidly attached to the vehicle adjacent the forward end thereof, longitudinally extending propelling members connected to the crank portions of the rear axle, a pair of oscillating links depending from the body adjacent the forward end thereof, longitudinally movable members attached to said link members, pedal members supported on the last named members and pivotal means connecting the propelling members with the pedal supporting members whereby when said springs are deflected relative to the body the propelling members may have a full floating movement.

12. In a toy vehicle of the character described, the combination of a body, a rear axle, longitudinal spring members secured at one end to the rear axle and at the other end to the body intermediate the front and the steering wheel thereof, spring shackles secured to the body intermediate the steering wheel and the rear axle thereof and engaging the springs to permit a full deflection thereof, a propelling mechanism connected to the rear axle, pedal operated links for actuating said propelling mechanism and means for pivotally connecting the pedal operated means and the propelling mechanism the axis of the pivotal connecting means extending longitudinally of the propelling mechanism.

13. In a toy vehicle of the character described the combination of a body, a pair of spring members connected to the rear crank axle of the vehicle and to the body, said spring members having bearing brackets mounted thereon and cylindrical rear axle bearings mounted in the brackets, crank driving means extending longitudinally of the body, pedal levers depending from the body and connected to the crank driving means and means interposed between the pedal levers and the crank driving means for permitting a floating movement of the rear axle and crank driving means relative to the pedal levers when either of said spring members is deflected.

14. In combination, in a toy vehicle, a vehicle body, a rear crank axle, spring members connecting the body to the axle, axle bearings and brackets therefor connecting the springs to the axle, axle driving means extending beneath the body and drivingly connected at one end to the crank portions of the axle, means depending from the body for supporting said axle driving means and means interposed between the axle driving means and said supporting means for permitting a twisting movement of the axle driving means relative to the supporting means when either spring is deflected by the raising of one end of the rear axle.

15. In a toy vehicle of the character described, the combination of a vehicle body, a propelling means therefor comprising a rear crank axle, propelling rods connected to the crank portions of the axle and extending longitudinally beneath the body of the vehicle and links supporting the forward end of the propelling members comprising oscillating pedal supporting members pivotally connected to the body and pivotal means loosely connecting the links to the propelling member and adapted to permit a floating movement of the propelling members relative to plane of movement of said links.

In testimony whereof, I hereunto affix my signature.

JAMES M. HOWE.